US012012988B2

(12) United States Patent
Nakamura et al.

(10) Patent No.: US 12,012,988 B2
(45) Date of Patent: Jun. 18, 2024

(54) ABNORMALITY DETECTION DEVICE AND FIXING STRUCTURE

(71) Applicant: Nippon Telegraph and Telephone Corporation, Tokyo (JP)

(72) Inventors: Masahito Nakamura, Musashino (JP); Tadashi Minotani, Musashino (JP); Eri Matsunaga, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 574 days.

(21) Appl. No.: 17/292,674

(22) PCT Filed: Nov. 21, 2019

(86) PCT No.: PCT/JP2019/045537
§ 371 (c)(1),
(2) Date: May 10, 2021

(87) PCT Pub. No.: WO2020/116173
PCT Pub. Date: Jun. 11, 2020

(65) Prior Publication Data
US 2022/0010826 A1  Jan. 13, 2022

(30) Foreign Application Priority Data
Dec. 5, 2018  (JP) ................. 2018-227890

(51) Int. Cl.
*F16B 5/02* (2006.01)
*G01M 5/00* (2006.01)
(Continued)

(52) U.S. Cl.
CPC ............... *F16B 5/02* (2013.01); *G01M 5/00* (2013.01); *G01N 22/02* (2013.01); *F16B 31/02* (2013.01); *G01N 2223/34* (2013.01)

(58) Field of Classification Search
CPC .. F16B 5/02; F16B 31/02; G01M 5/00; G01N 22/02; G01N 2223/34
See application file for complete search history.

(56) References Cited

U.S. PATENT DOCUMENTS

2014/0190267 A1 * 7/2014 Mekid .................. F16B 31/02
73/761

FOREIGN PATENT DOCUMENTS

| CN | 104851246 A | * | 8/2015 | ........... G08B 21/187 |
| CN | 205228815 U | * | 5/2016 | |
| WO | WO-0213159 A1 | * | 2/2002 | ........... G08B 13/149 |

OTHER PUBLICATIONS

Hatanaka Corporation, *Key Point for Early Detection of Loose Screws*, Cost Reduction Equipment Maintenance.com, Nov. 12, 2018 (retrieved), http://maintenance119.com/screw/point03_scr.html, pp. 1.

* cited by examiner

*Primary Examiner* — Mark R Gaworecki
(74) *Attorney, Agent, or Firm* — Workman Nydegger (57) ABSTRACT

An abnormality detection device and a fixing structure which are suitable for detecting an abnormality of a fastener such as a bolt or a nut are disclosed. An abnormality detection device detects an abnormality of a fixing structure, which includes a conductor and which fix steel plates to each other, and a spacer which includes an insulator and which is disposed between the steel plates and the washer. The abnormality detection device includes a transmission antenna that radiates electromagnetic waves to the fixing structure, a reception antenna that receives electromagnetic waves reflected by the fixing structure, and an abnormality detector that changes a frequency of the electromagnetic waves radiated from the transmission antenna to acquire frequency characteristics of standing waves received by the (Continued)

reception antenna. The abnormality of the fixing structure is detected by comparing the frequency characteristics with frequency characteristics in a normal state.

10 Claims, 6 Drawing Sheets

(51) Int. Cl.
*G01N 22/02* (2006.01)
*F16B 31/02* (2006.01)

ABNORMALITY DETECTION DEVICE AND FIXING STRUCTURE

TECHNICAL FIELD

The present invention relates to an abnormality detection device and a fixing structure, and mainly relates to a technique for detecting an abnormality of a fastener such as a bolt or a nut.

BACKGROUND ART

Bolts and nuts which are used as fasteners for steel members of structures such as bridges or steel towers may be loosened due to vibrations of the structures, which may result in a major accident. To prevent this, there is a method of marking an angle in a rotation axis direction when a bolt and a nut are fixed as in Non Patent Literature 1.

CITATION LIST

Non Patent Literature

Non Patent Literature 1: "Points for early detection of screw looseness," accessed on Nov. 12, 2018, the Internet <URL: http://maintenance119.com/screw/point03_scr.html>

SUMMARY OF THE INVENTION

Technical Problem

However, it is difficult to apply the method disclosed in Non Patent Literature 1 to inspection of bolts and nuts installed at a lower part of a bridge or at an upper part of a steel tower because an inspector needs to be near the locations of the bolts and nuts so that the inspector can visually check them. In addition, it is necessary to inspect both bolts and nuts because it is unclear which of the bolts or nuts may have rotated. Further, in a case where the bolts and nuts have rotated and loosened by an integral multiple of 360 degrees, marks thereon will have returned to the same place, and thus it looks as if the bolts and nuts have no change compared with the case where there is no looseness. Marks carved on outdoor structures may deteriorate and become invisible due to ultraviolet rays or wind and snow.

The present invention has been made in view of such problems, and an object thereof is to provide an abnormality detection device and a fixing structure which are suitable for detecting an abnormality of a fastener such as a bolt or a nut.

Means for Solving the Problem

To achieve the above object, according to a first aspect of the invention, there is provided an abnormality detection device configured to detect an abnormality of a fixing structure including a bolt, a nut, and a washer which include a conductor and fix a component, and a spacer which includes an insulator and is disposed between the component and the washer, the abnormality detection device including: a transmission antenna configured to radiate electromagnetic waves to the fixing structure; a reception antenna configured to receive electromagnetic waves reflected by the fixing structure; and an abnormality detector configured to change a frequency of the electromagnetic waves radiated from the transmission antenna to acquire frequency characteristics of standing waves received by the reception antenna and detect an abnormality of the fixing structure by comparing the frequency characteristics with frequency characteristics in a normal state.

According to a second aspect of the invention, in the first aspect of the invention, the fixing structure includes an insulating material on the component, and a conductive material on the insulating material, the conductive material being electrically connected to the washer.

According to a third aspect of the invention, in the second aspect of the invention, the fixing structure further includes the spacer and the washer on a side of the nut, and a shape of the conductive material on a side of the bolt is a planar antenna shape.

According to a fourth aspect of the invention, in any one of the first to third aspects of the invention, a distance measuring sensor configured to measure a distance from the transmission antenna and the reception antenna to the component is further included, and the abnormality detector confirms that the distance measured by the distance measuring sensor is equal to a distance in a normal state, and then detects an abnormality of the fixing structure.

According to a fifth aspect of the invention, there is provided a fixing structure including the structure according to any one of the first to fourth aspects.

Effects of the Invention

According to the present invention, it is possible to provide an abnormality detection device and a fixing structure which are suitable for detecting an abnormality of a fastener such as a bolt or a nut.

DESCRIPTION OF EMBODIMENTS

Hereinafter, embodiments of the present invention will be described in detail with reference to the accompanying drawings. Meanwhile, in the drawings, the same or similar portions are denoted by the same or similar reference signs. However, it should be noted that the drawings are schematic, and a relationship between a thickness and planar dimensions, the ratio of thicknesses of layers, and the like are different from those in reality. Thus, specific thicknesses or dimensions should be determined with reference to the following description. In addition, as a matter of course, portions having different mutual dimensional relationships or ratios from those in the drawings are also included.

First Embodiment

Figure 1:
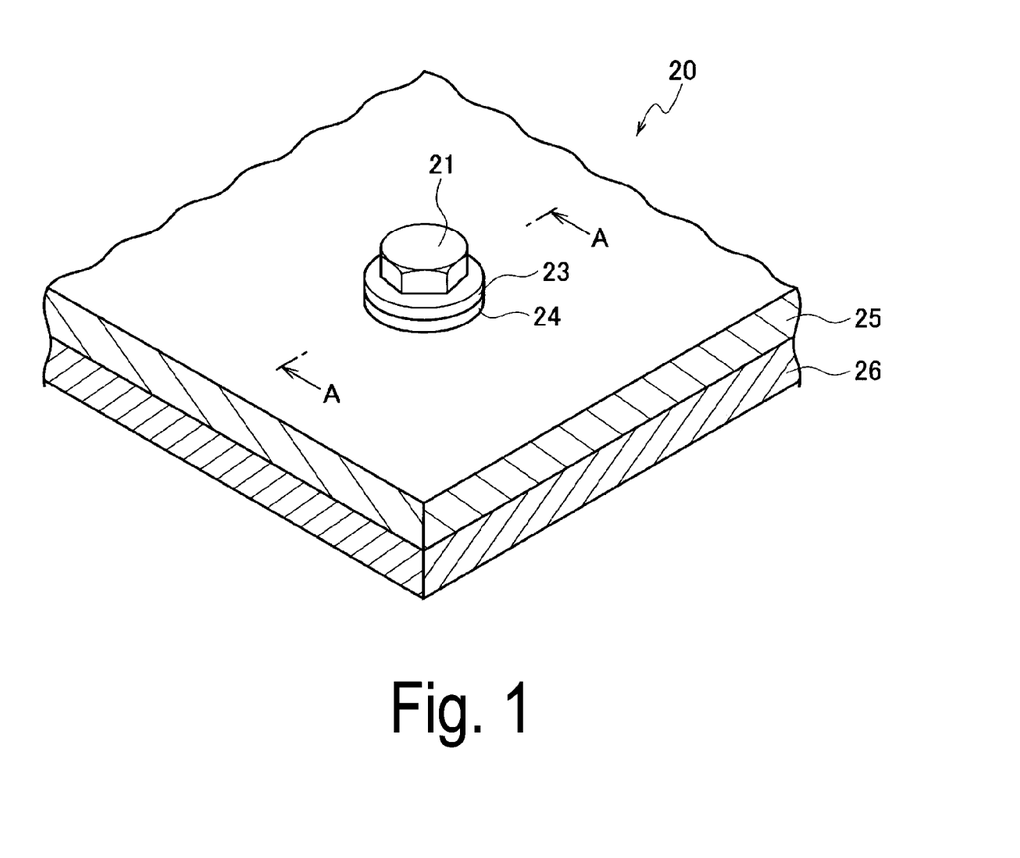
FIG. 1 is a perspective view illustrating an example of a fixing structure according to a first embodiment.

FIG. 1 is a perspective view illustrating an example of a fixing structure 20 according to a first embodiment. Here, a case where a bolt 21 and a nut 22 (which is not illustrated) are used as fasteners for steel members of a structure such as a bridge or a steel tower is illustrated. Specifically, two steel plates 25 and 26 are fixed to each other with a large number of bolts 21 and nuts 22. A washer 23 and a spacer 24 are put below the bolt 21.

Figure 2:
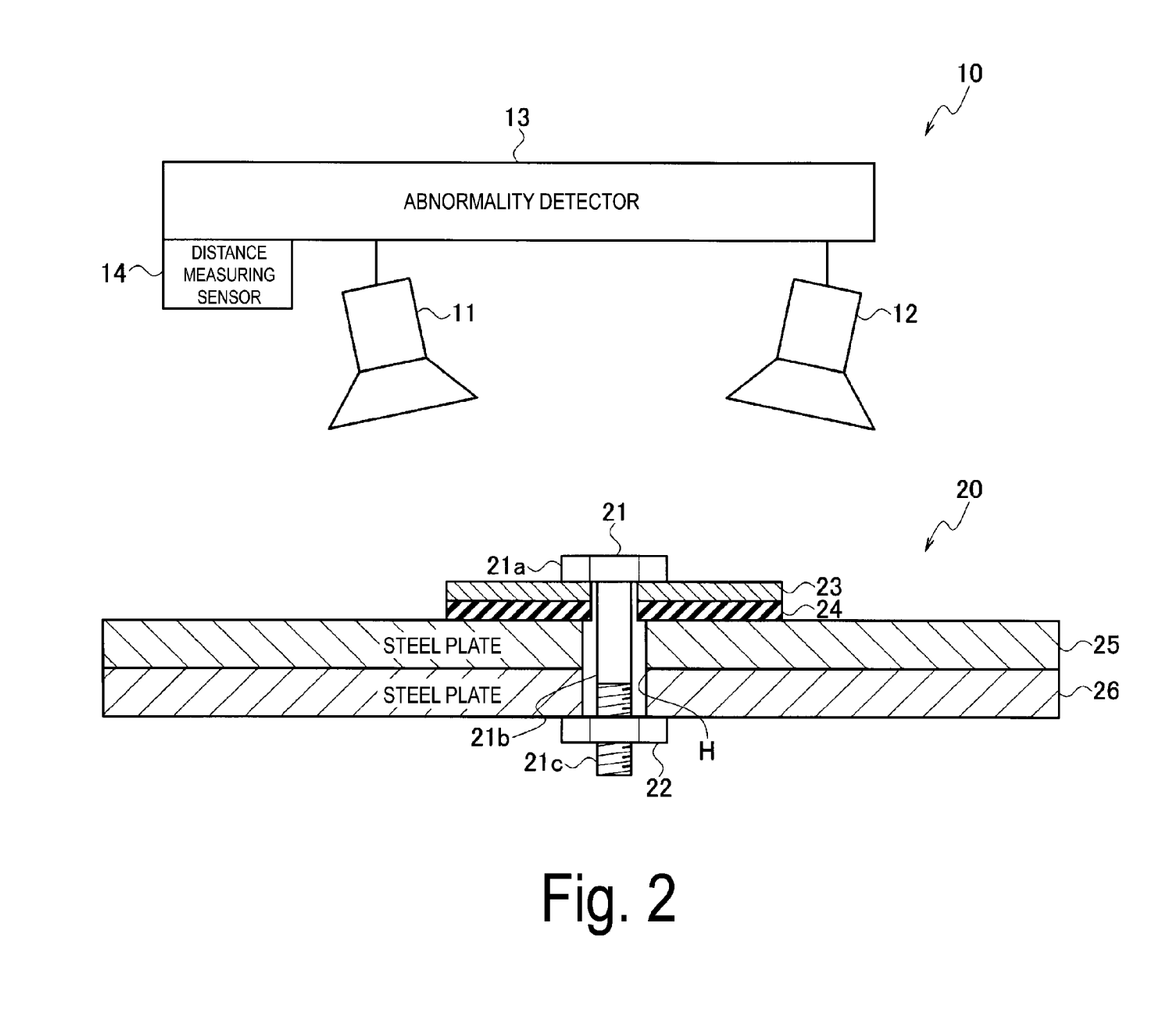
FIG. 2 is a diagram illustrating a state in which the fixing structure according to the first embodiment is inspected.

FIG. 2 illustrates a state in which the fixing structure 20 according to the first embodiment is inspected using an abnormality detection device 10. FIG. 2 illustrates a cross-sectional configuration of the fixing structure 20 along line A-A in FIG. 1.

The fixing structure 20 includes the bolt 21, the nut 22, and the washer 23 which are formed from a conductor and fix steel plates 25 and 26 to each other, and the spacer 24 which is formed from an insulator and disposed between the steel plates 25 and 26 and the washer 23. The steel plates 25 and 26 are examples of components having high electrical conductivity. The bolt 21 is inserted into a hole H bored in the steel plates 25 and 26, and the nut 22 is fitted and fixed to a threaded portion 21c of the bolt 21 projecting from the opposite side. A neck portion 21a of the bolt 21 does not come into direct contact with the steel plate 25. The diameter of the bolt 21 is smaller than the diameter of the hole H, and thus the bolt 21 and the steel plates 25 and 26 are normally not electrically continuous. In a case where there is a concern that the bolt 21 may be inserted eccentrically with respect to the hole H and come into contact with the hole H, a neck lower portion 21b of the bolt 21 may be coated. The diameters of the washer 23 and the spacer 24 are not particularly limited, and may be approximately the same as the diameter of the bolt 21.

The abnormality detection device 10 is a device that detects an abnormality of the fixing structure 20, and includes a transmission antenna 11, a reception antenna 12, and an abnormality detector 13. Here, the transmission antenna 11 radiates electromagnetic waves to the fixing structure 20. In addition, the reception antenna 12 receives electromagnetic waves reflected by the fixing structure 20. In addition, the abnormality detector 13 changes the frequency of electromagnetic waves radiated from the transmission antenna 11 to acquire the frequency characteristics of standing waves received by the reception antenna 12, and detects an abnormality of the fixing structure 20 by comparing the frequency characteristics with frequency characteristics in a normal state. Hereinafter, a method of detecting an abnormality of the fixing structure 20 will be described in detail.

In a state in which the bolt 21 and the nut 22 are fixed to the steel plates 25 and 26 normally, the steel plates 25 and 26 formed from metal and the washer 23 formed from a conductor are mechanically fixed to each other by the bolt 21 with the spacer 24 interposed therebetween, and the bolt 21 is mechanically fixed by the nut 22 on the opposite side of the steel plates 25 and 26. In addition, the nut 22 is in electrical contact with the steel plates 25 and 26. In this state, with the washer 23 and the bolt 21 regarded as a signal line and with the steel plates 25 and 26 regarded as a ground plane, the washer 23, the bolt 21, and the steel plates 25 and 26 can be regarded as a transmission line short-circuited by the bolt 21. Thus, standing waves are generated in a case where the wavelength of electromagnetic waves radiated from the transmission antenna 11 is an integral multiple of four times the sum of the following two electrical lengths. A first length is an electrical length obtained by dividing the radius of the washer 23 by the square root of the dielectric constant of the spacer 24. A second length is an electrical length obtained by dividing the thickness of the steel plates 25 and 26 by the square root of the dielectric constant of a dielectric between the steel plates 25 and 26 and the bolt 21.

In a state in which the nut 22 is loose, a parasitic capacitance occurs between the nut 22 and the steel plates 25 and 26 which are short-circuited in a normal state, which leads to a change in the frequency of electromagnetic waves at which standing waves are generated. It is possible to detect an abnormality of fixation of the bolt 21 and the nut 22 by detecting a change in the frequency at which the standing waves are generated.

Some of the electromagnetic waves radiated from the transmission antenna 11 are reflected by the washer 23 and reach the reception antenna 12. The intensity of reflection becomes stronger or weaker due to the generation of the standing waves, and thus a change in a frequency at which the standing waves are generated also causes a change in the frequency characteristics of the intensity of reflection.

Consequently, in a state in which the bolt 21 and the nut 22 are fixed, initial frequency characteristics (normal frequency characteristics in an initial state) are acquired and stored by the abnormality detector 13. In this case, the reception antenna 12 receives not only electromagnetic waves reflected by the washer 23, but also electromagnetic waves reflected by the steel plates 25 and 26. Because a change in a distance from the transmission antenna 11 and the reception antenna 12 to the steel plates 25 and 26 also causes a change in electromagnetic waves reflected by the steel plates 25 and 26, the distance from the transmission antenna 11 and the reception antenna 12 to the steel plates 25 and 26 when the initial frequency characteristics are acquired is measured and stored by a distance measuring sensor 14.

During inspection, the distance from the transmission antenna 11 and the reception antenna 12 to the steel plates 25 and 26 is measured by the distance measuring sensor 14, it is confirmed that the distance is the same as the distance when the initial frequency characteristics are acquired, and then frequency characteristics are acquired by the abnormality detector 13. Here, in a case where the frequency characteristics acquired by the abnormality detector 13 have not changed from the initial frequency characteristics, the fixation of the bolt 21 and the nut 22 is determined to be in a normal state. On the other hand, in a case where frequency characteristics acquired by the abnormality detector 13 have changed from the initial frequency characteristics, the fixation of the bolt 21 and the nut 22 is determined to be in an abnormal state, and an external device such as a PC or a tablet is notified of this determination.

Figure 3:
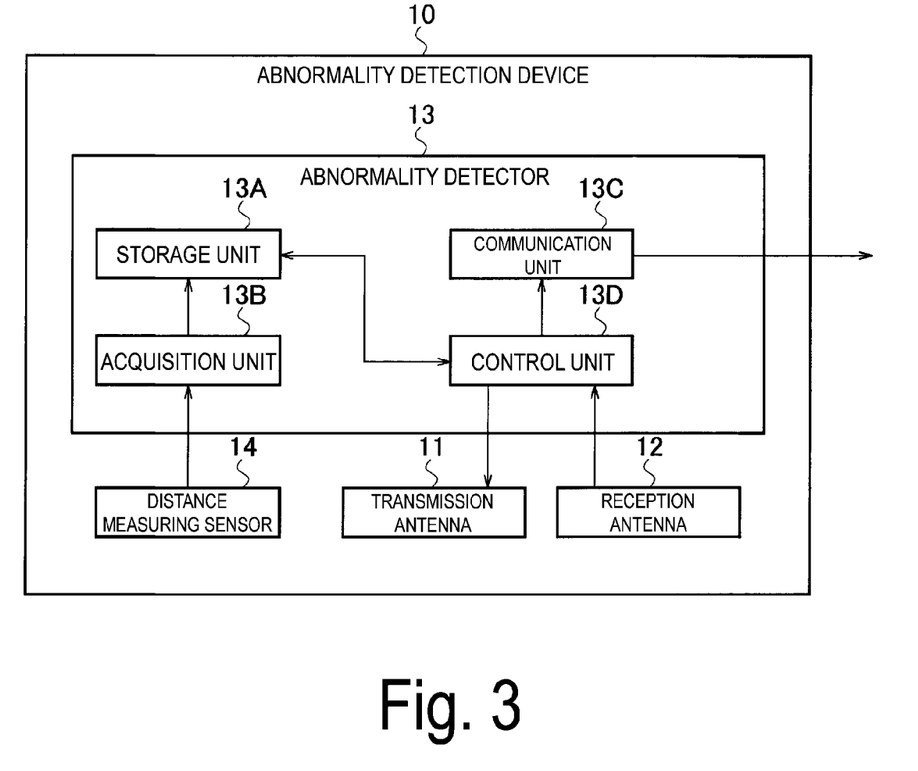
FIG. 3 is a functional block diagram of an abnormality detection device according to the first embodiment.

FIG. 3 is a functional block diagram of the abnormality detection device 10 according to the first embodiment. This abnormality detection device 10 is a device that detects an abnormality of the fixing structure 20, and includes the transmission antenna 11, the reception antenna 12, the abnormality detector 13, and the distance measuring sensor 14, as illustrated in FIG. 3. The abnormality detector 13 includes a storage unit 13A, an acquisition unit 13B, a communication unit 13C, and a control unit 13D. The storage unit 13A is a storage device that stores various types of data (for example, data indicating a frequency range including the peak of a frequency in a normal state). The acquisition unit 13B is a functional unit that acquires a sensor value of the distance measuring sensor 14. The communication unit 13C is a functional unit that performs communication with an external device such as a PC or a tablet. The control unit 13D is a functional unit that controls each unit such as the transmission antenna 11 or the reception antenna 12 and performs various types of control required for detecting an abnormality.

Figure 4:
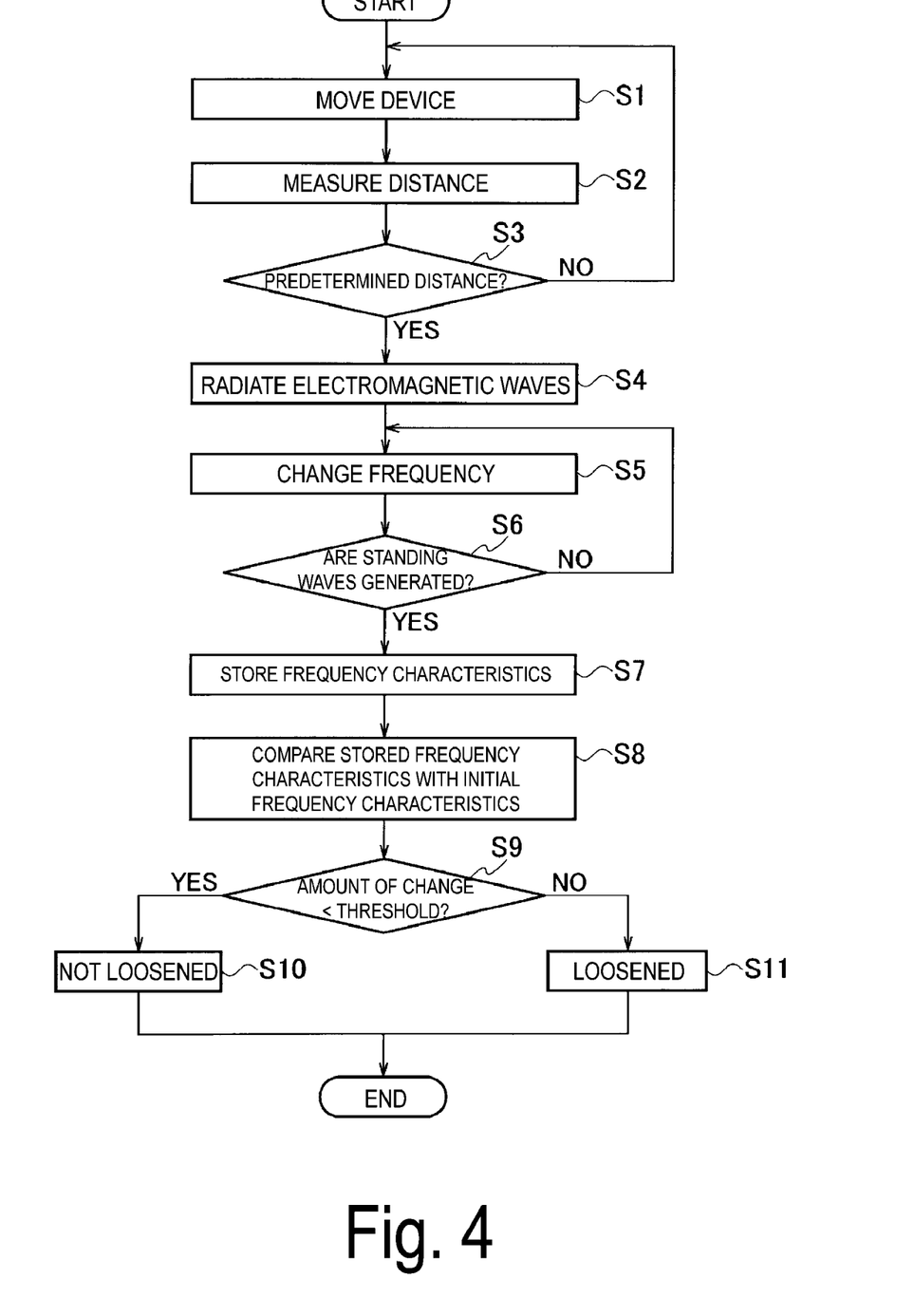
FIG. 4 is a flowchart illustrating an operation example of the abnormality detection device according to the first embodiment.

FIG. 4 is a flowchart illustrating an operation example of the abnormality detection device 10 according to the first embodiment. Hereinafter, the configuration of the abnormality detection device 10 will be described together with its operation with reference to FIG. 4.

First, the abnormality detection device 10 is brought close to the fixing structure 20 to be inspected, and a distance between the fixing structure 20 and the abnormality detection device 10 is measured (step S1->S2). Next, in a case where it is confirmed that the distance between the fixing structure 20 and the abnormality detection device 10 is a predetermined distance, electromagnetic waves are radiated from the transmission antenna 11, the frequency of the electromagnetic waves is changed, and standing waves are generated, and frequency characteristics at that time are stored (step S3->S4->S5->S6->S7). This "predetermined distance" is specifically a distance (distance in an initial state) from the transmission antenna 11 and the reception antenna 12 to the steel plates 25 and 26 when initial frequency characteristics are acquired. Next, the frequency characteristics stored in this manner are compared with the frequency characteristics stored initially (step S8->S9). At this time, in a case where the amount of change between the frequency characteristics at that time and the initial frequency characteristics is smaller than a threshold, it is determined that the bolt 21 and the nut 22 are not loosened (normal) (step S9->S10). On the other hand, in a case where the amount of change between these frequency characteristics is greater than the threshold, it is determined that the bolt 21 and the nut 22 are loosened (abnormal) (step S9->S11). For example, when a frequency at which the intensity of electromagnetic waves peaks is detected, and then the peak disappears or shifts, it is determined that the bolt 21 and the nut 22 are loosened (abnormal).

Meanwhile, here, although it is confirmed that the distance between the fixing structure 20 and the abnormality detection device 10 is set to a distance in an initial state, the present invention is not limited thereto. That is, the abnormality detection device 10 may use the distance measuring sensor 14 to perform distance correction (estimation) of the intensity of reflection.

As described above, according to the first embodiment, it is possible to detect looseness of the bolt 21 and the nut 22 on the basis of a result of comparison with frequency characteristics when the bolt 21 and the nut 22 are fixed normally. Thus, it is possible to detect looseness through measurement of one of the bolt 21 and the nut 22 installed at a location where visual monitoring from a remote place is difficult, and to detect looseness even when the bolt 21 and the nut 22 rotate by an integral multiple of 360 degrees.

Second Embodiment

Hereinafter, a second embodiment will be described. A description will be given below with focus on differences from the first embodiment, and detailed description of the same points will not be given.

Figure 5:
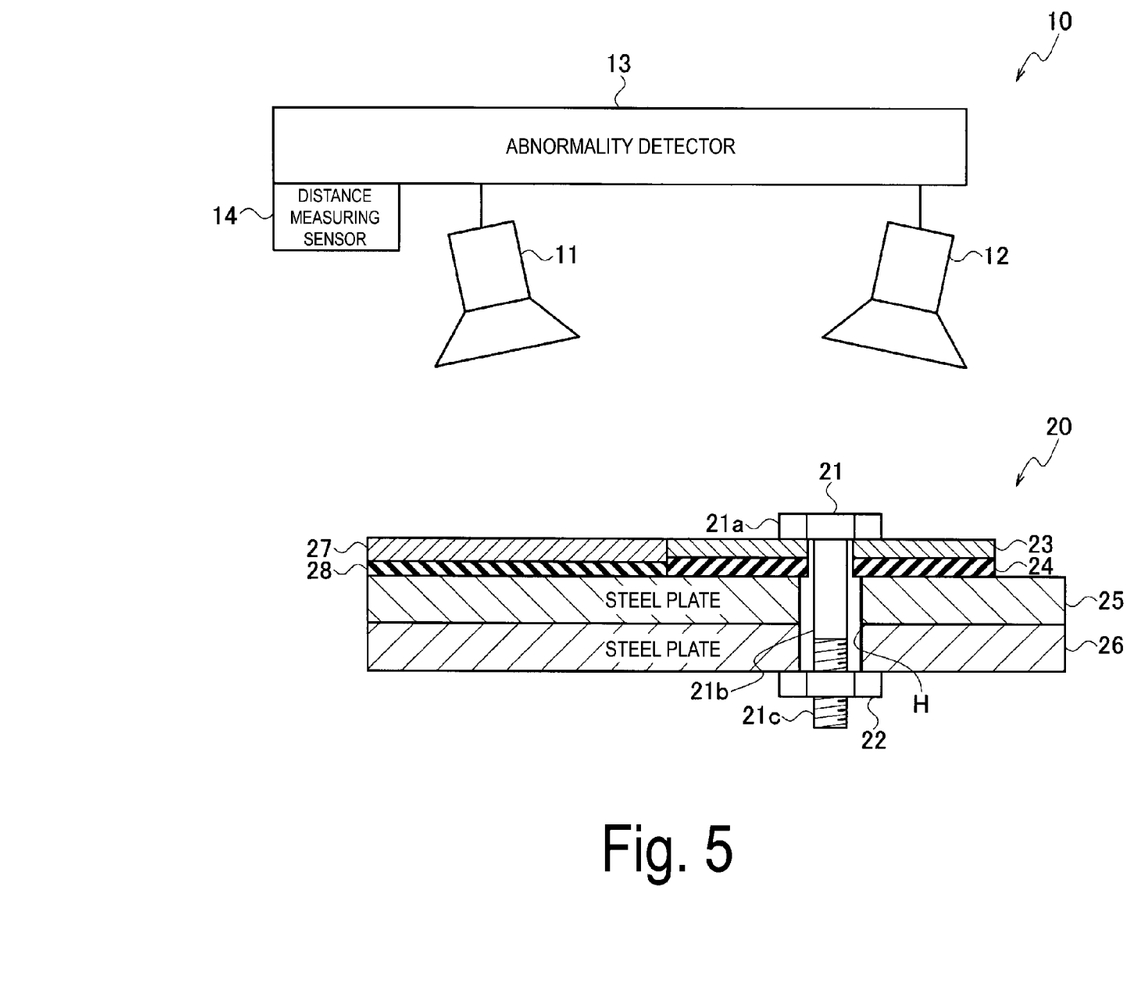
FIG. 5 is a diagram illustrating a state in which a fixing structure according to a second embodiment is inspected.

FIG. 5 is a diagram illustrating a state in which a fixing structure 20 according to the second embodiment is inspected. This embodiment is different from the first embodiment in that a conductive material 27 for converting a frequency at which standing waves are generated and an insulating material 28 thinner than the spacer 24 are added. Otherwise this embodiment is the same as the first embodiment.

The sizes of the bolt 21 and the washer 23 are generally determined according to structures, and thus it may be difficult to generate desired standing waves. In the second embodiment, as illustrated in FIG. 5, the bolt 21 and the washer 23, and the conductive material 27 are electrically connected to each other. Thereby, standing waves are generated at a frequency having a wavelength which is an integral multiple of four times a length obtained by adding the following three electrical lengths. A first length is an electrical length obtained by dividing the radius of the washer 23 by the square root of the dielectric constant of the spacer 24. A second length is an electrical length obtained by dividing the thickness of the steel plates 25 and 26 by the square root of the dielectric constant of the dielectric between the steel plates 25 and 26 and the bolt 21. A third length is an electrical length obtained by dividing the length of the conductive material 27 by the square root of the dielectric constant of the insulating material 28. Thus, it is possible to generate desired standing waves by adjusting the length of the conductive material 27.

As described above, according to the second embodiment, on the same principle as the first embodiment, it is possible to detect looseness of the bolt 21 and the nut 22 on the basis of a result of comparison with frequency characteristics when the bolt 21 and the nut 22 are fixed normally. In addition, it is possible to generate desired standing waves by adjusting the length of the conductive material 27.

Meanwhile, in FIG. 5, the conductive material 27 and the insulating material 28 are drawn only on the left side of the bolt 21 and the washer 23, but a region in which the conductive material 27 and the insulating material 28 are provided can be appropriately adjusted. Similarly to the bolt 21 side, the conductive material 27 and the insulating material 28 can also be provided on the nut 22 side.

In addition, in the above description, although the insulating material 28 thinner than the spacer 24 is added, the thickness of the insulating material 28 can be appropriately adjusted. That is, it is only required that the bolt 21 and the washer 23 be configured to be electrically connected to the conductive material 27.

Third Embodiment

Hereinafter, a third embodiment will be described. A description will be given below with focus on differences from the second embodiment, and detailed description of the same points will not be given.

Figure 6A:
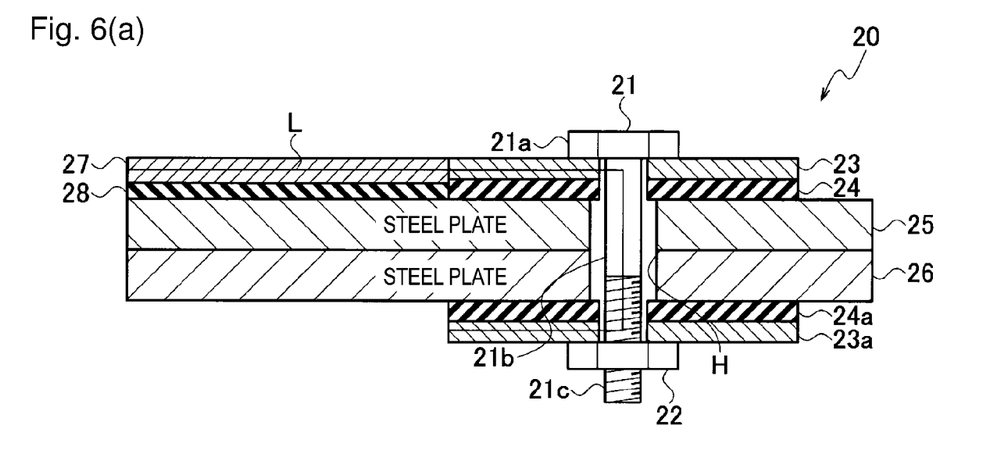
FIGS. 6(a) and 6(b) are diagrams illustrating a fixing structure according to a third embodiment.
Figure 6B:
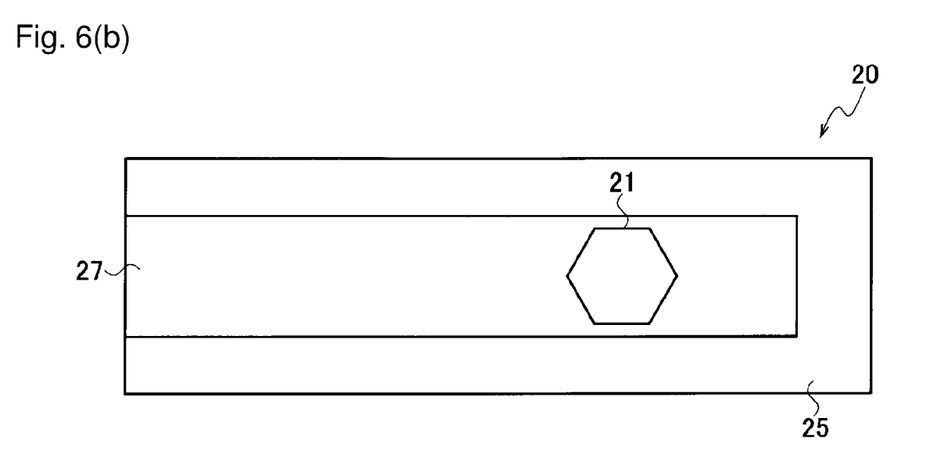

FIG. 6(a) is a cross-sectional view of the fixing structure 20 according to the third embodiment, and FIG. 6(b) is a plan view of the fixing structure 20 according to the third embodiment. In the third embodiment, a spacer 24a and a washer 23a are also provided on the nut 22 side, the conductive material 27 on the bolt 21 side is formed into a planar antenna shape to improve the efficiency of coupling with the antennas 11 and 12 of the abnormality detection device 10, and thus one type of antennas 11 and 12 of the abnormality detection device 10 is obtained.

By forming a planar antenna from the conductive material 27, electromagnetic waves radiated from the angle of a main lobe of the planar antenna of the conductive material 27 are efficiently received by the planar antenna, and energy of electromagnetic waves reflected at the same time is also radiated to the angle of the main lobe. Thus, in the following case, electromagnetic waves radiated from the transmission antenna 11 of the abnormality detection device 10 and reflected by the nut 22 can be efficiently received by the reception antenna 12 of the abnormality detection device 10.

This "following case" is a case in which the abnormality detection device 10 is installed at a position where the main lobe of the antennas 11 and 12 of the abnormality detection device 10 and the main lobe of the planar antenna of the conductive material 27 overlap each other. Because the intensity of reflection becomes stronger or weaker due to the generation of standing waves, a change in a frequency at which the standing waves are generated also causes a change in frequency characteristics of the intensity of reflection.

Consequently, in a state in which the bolt 21 and the nut 22 are fixed, initial frequency characteristics are acquired and stored by the abnormality detector 13. Thereafter, similarly to the first embodiment, it is determined that the fixation of the bolt 21 and the nut 22 is in a normal state in a case where the frequency characteristics acquired by the abnormality detector 13 have not changed from the initial frequency characteristics. On the other hand, in a case where the frequency characteristics acquired by the abnormality detector 13 have changed from the initial frequency characteristics, the fixation of the bolt 21 and the nut 22 is determined to be in an abnormal state, and an external device such as a PC or a tablet is notified of this determination.

As described above, according to the third embodiment, on the same principle as the first embodiment, it is possible to detect looseness of the bolt 21 and the nut 22 on the basis of a result of comparison with frequency characteristics when the bolt 21 and the nut 22 are fixed normally. In addition, it is possible to improve the efficiency of coupling with the antennas 11 and 12 of the abnormality detection device 10 by forming the conductive material 27 into a planar antenna shape.

Meanwhile, although a simple rectangular antenna shape is illustrated in FIG. 6(b), a variety of shapes such as a circle or a square can be adopted as the antenna shape. Moreover, in a case where such an antenna shape is adopted, a design is carried out such that the length of a line L in the drawing corresponds to an integral multiple of a wavelength obtained by converting a frequency to be actually used so as to have a wavelength resonating with the electromagnetic waves radiated from the transmission antenna 11.

Conclusion

As described above, the abnormality detection device 10 according to the embodiment of the present invention detects an abnormality of the fixing structure 20 including the bolt 21, the nut 22, and the washer 23 which are formed from a conductor and fix the steel plates 25 and 26 to each other, and the spacer 24. Here, the spacer 24 is formed from an insulator, and is disposed between the steel plates 25 and 26 and the washer 23. The abnormality detection device 10 according to the embodiment of the present invention includes the transmission antenna 11, the reception antenna 12, and the abnormality detector 13. Here, the transmission antenna 11 radiates electromagnetic waves to the fixing structure 20. The reception antenna 12 receives electromagnetic waves reflected by the fixing structure 20. The abnormality detector 13 changes the frequency of the electromagnetic waves radiated from the transmission antenna 11 to acquire the frequency characteristics of standing waves received by the reception antenna 12, and detects an abnormality of the fixing structure 20 by comparing the frequency characteristics with frequency characteristics in a normal state. Thereby, standing waves excited by radiating electromagnetic waves to the bolt 21 and the nut 22 to be inspected are received by the reception antenna 12, and thus looseness of the bolt 21 and the nut 22 can be detected from a change obtained by comparison with frequency characteristics when the bolt and the nut are tightened.

In addition, the fixing structure 20 may include the insulating material 28 which is formed on the steel plates 25 and 26, and the conductive material 27 which is formed on the insulating material 28 and electrically connected to the washer 23. Thereby, it is possible to generate desired standing waves by adjusting the length of the conductive material 27.

In addition, the fixing structure 20 may also include the spacer 24a and the washer 23a on the nut 22 side, and the shape of the conductive material 27 on the bolt 21 side may be a planar antenna shape. Thereby, it is possible to improve the efficiency of coupling with the antennas 11 and 12 of the abnormality detection device 10 by forming the conductive material 27 into a planar antenna shape.

In addition, the distance measuring sensor 14 that measures a distance from the transmission antenna 11 and the reception antenna 12 to the steel plates 25 and 26 may be included. The abnormality detector 13 may check that the distance measured by the distance measuring sensor 14 is the same as a distance in a normal state, and then detect an abnormality of the fixing structure 20. That is, in the case of measuring a fixed point at a fixed distance, the distance measuring sensor 14 is not required, but in the case where the distance is changed, distance correction of the intensity of reflection can be performed using the distance measuring sensor 14.

Meanwhile, the present invention not only can be achieved as such an abnormality detection device 10, but also can be achieved as the fixing structure 20 to be inspected by such an abnormality detection device 10.

Other Embodiments

As described above, although several embodiments have been described, it should be understood that the description and drawings which are parts of the disclosure are merely illustrative, and are not intended to limit the invention. From the disclosure, various alternative embodiments, examples, and operational techniques will be apparent to those skilled in the art.

REFERENCE SIGNS LIST

10 Abnormality detection device
11 Transmission antenna
12 Reception antenna
13 Abnormality detector
14 Distance measuring sensor
20 Fixing structure
21 Bolt
22 Nut
23 Washer
24 Spacer
25 Steel plate
26 Steel plate
27 Conductive material
28 Insulating material

The invention claimed is:

1. An abnormality detection device configured to detect an abnormality of a fixing structure, the fixing structure including:

a bolt, a nut, and a washer which comprise a conductor and fix a component, and a spacer which comprises an insulator and is disposed between the component and the washer, the abnormality detection device comprising:

a transmission antenna configured to radiate electromagnetic waves to the fixing structure;

a reception antenna configured to receive electromagnetic waves reflected by the fixing structure; and an abnormality detector configured to change a frequency of the electromagnetic waves radiated from the transmission antenna to acquire frequency characteristics of standing waves received by the reception antenna and detect an abnormality of the fixing structure by comparing the frequency characteristics with frequency characteristics in a normal state.

2. The abnormality detection device according to claim 1, wherein the fixing structure includes:

an insulating material on the component, and a conductive material on the insulating material, the conductive material being electrically connected to the washer.

3. The abnormality detection device according to claim 2, wherein the fixing structure further includes the spacer and the washer on a side of the nut, and a shape of the conductive material on a side of the bolt is a planar antenna shape.

4. The abnormality detection device according to claim 3, further comprising:

a distance measuring sensor configured to measure a distance from the transmission antenna and the reception antenna to the component, wherein the abnormality detector confirms that the distance measured by the distance measuring sensor is equal to a distance in a normal state, and then detects an abnormality of the fixing structure.

5. A fixing structure comprising the structure according to claim 3.

6. The abnormality detection device according to claim 2, further comprising:

a distance measuring sensor configured to measure a distance from the transmission antenna and the reception antenna to the component, wherein the abnormality detector confirms that the distance measured by the distance measuring sensor is equal to a distance in a normal state, and then detects an abnormality of the fixing structure.

7. A fixing structure comprising the structure according to claim 2.

8. The abnormality detection device according to claim 1, further comprising:

a distance measuring sensor configured to measure a distance from the transmission antenna and the reception antenna to the component, wherein the abnormality detector confirms that the distance measured by the distance measuring sensor is equal to a distance in a normal state, and then detects an abnormality of the fixing structure.

9. A fixing structure comprising the structure according to claim 8.

10. A fixing structure comprising the structure according to claim 1.

* * * * *